United States Patent
Kuroshima

[11] Patent Number: 5,995,689
[45] Date of Patent: Nov. 30, 1999

[54] OPTICAL DIVIDER

[75] Inventor: Jun Kuroshima, Tokyo, Japan

[73] Assignee: NEC Corporation, Tokyo, Japan

[21] Appl. No.: 08/985,236

[22] Filed: Dec. 4, 1997

[30] Foreign Application Priority Data

Dec. 4, 1996 [JP] Japan ................................... 8-323690

[51] Int. Cl.$^6$ .................................................. G02B 6/28
[52] U.S. Cl. ............................................................ 385/24
[58] Field of Search .................................. 359/128, 139, 359/117; 385/24, 48, 15, 16

[56] References Cited

U.S. PATENT DOCUMENTS

| 5,170,273 | 12/1992 | Nishio | 359/128 |
| 5,319,485 | 6/1994 | Yasui et al. | 359/128 |
| 5,450,224 | 9/1995 | Johansson | 359/128 |
| 5,537,239 | 7/1996 | Sotom et al. | 359/117 |
| 5,566,014 | 10/1996 | Glance | 359/124 |
| 5,841,556 | 11/1998 | Hong et al. | 359/117 |

FOREIGN PATENT DOCUMENTS 6-224850  8/1994  Japan .

*Primary Examiner*—Hung N. Ngo
*Attorney, Agent, or Firm*—Sughrue, Mion, Zinn, Macpeak & Seas, PLLC

[57] ABSTRACT

Disclosed is an optical divider with three input ports and three output ports for dividing an optical signal, which has: three base circuits, each of which having a first optical coupler which is connected to a predetermined input port of the three input ports and outputs a first optical signal and a second optical signal by dividing an optical signal to be input to the predetermined input port in two directions, an optical switch which has two optical signal inputs and one optical signal output which is connected to an output port of the three output ports which is paired with the predetermined input port and selects either of two optical signal to be input to the two optical signal inputs by using the first optical signal as a selection signal to output it from the optical signal output, and a second optical coupler where the second optical signal is input and then is further divided into a third optical signal and a fourth optical signal in two directions; wherein the third and fourth optical signals of one of the three base circuits are individually input to one of the two optical signal inputs of an optical switch in two base circuits other than the one of the three base circuits.

4 Claims, 3 Drawing Sheets

OPTICAL DIVIDER

FIELD OF THE INVENTION

This invention relates to an optical divider, and more particularly to a submarine optical divider for dividing an optical signal in a transmission line where a wavelength-multiplexed optical signal is transmitted.

BACKGROUND OF THE INVENTION

A submarine optical divider has been used to divide a wavelength-multiplexed optical signal in a submarine optical transmission line. For example, a submarine optical divider is composed of components as shown in FIG. 1. In this submarine optical divider [prior art 1] optical path switching information is carried on a main signal of light input 1, then converted into an electrical signal by an O/E converter in the submarine optical divider, thereafter decoded by a decoder. By using the optical path switching information to be decoded, an optical switch 1 is switched.

Also, U.S. Pat. No. 5,170,273 discloses a wavelength-division switching system for optical frequency-shift keying signals [prior art 2], whose technical field is close to that of the invention, where E/O converters and O/E converters are used.

Further, Japanese patent application laid-open No. 6-224850 (1994) discloses an optical switch control system [prior art 3] where only necessary information is input through a wavelength filter to an optical switch controller so as to switch a transmission line by an optical control signal. This is technically close to the invention only as to controlling of optical switch.

However, when optical path switching information is carried on a main signal, as disclosed in prior arts 1 and 2, O/E converters and E/O converters need to-be provided in the device. Therefore, the volume of the entire submarine optical divider is so much increased. The increased volume of the submarine-optical divider causes a difficulty in handling, such as laying of device.

SUMMARY OF THE INVENTION

Accordingly, it is an object of the invention to provide a submarine optical divider which can be miniaturized.

According to the first feature of the invention, an optical divider with three input ports and three output ports for dividing an optical signal, comprises:

three base circuits, each of which comprising a first optical coupler which is connected to a predetermined input port of the three input ports and outputs a first optical signal and a second optical signal by dividing an optical signal to be input to the predetermined input port in two directions, an optical switch which is composed of two optical signal inputs and one optical signal output which is connected to an output port of the three output ports which is paired with the predetermined input port and selects either of two optical signal to be input to the two optical signal inputs by using the first optical signal as a selection signal to output it from the optical signal output, and a second optical coupler where the second optical signal is input and then is further divided into a third optical signal and a fourth optical signal in two directions;

wherein the third and fourth optical signals of one of the three base circuits are individually input to one of the two optical signal inputs of an optical switch in two base circuits other than the one of the three base circuits.

According to the second feature of the invention, comprises:

optical divider, comprising:

an optical coupler for dividing an optical input signal into first and second optical output signals;

an optical filter for transmitting an optical signal of a predetermined wavelength; and an optical switch having first and second input terminals, an output terminal, and a control terminal;

wherein the optical signal of the predetermined wavelength is supplied from the optical filter to the optical switch, when the optical coupler is supplied with the optical input signal which is a wavelength-multiplexed signal comprising an information optical signal and the optical signal of the predetermined wavelength, so that the first input terminal is coupled in the optical switch, to the output terminal, and no optical signal of the predetermined wavelength is supplied from the optical filter to the control terminal of the optical switch, when the optical coupler is supplied with the optical input signal comprising no optical signal of the predetermined wavelength, so that the second input terminal is coupled in the optical switch to the output terminal.

BRIEF DESCRIPTION OF THE DRAWINGS

The invention will be explained in more detail in conjunction with the-appended drawings, wherein.

DESCRIPTION OF THE PREFERRED EMBODIMENT

Figure 1:
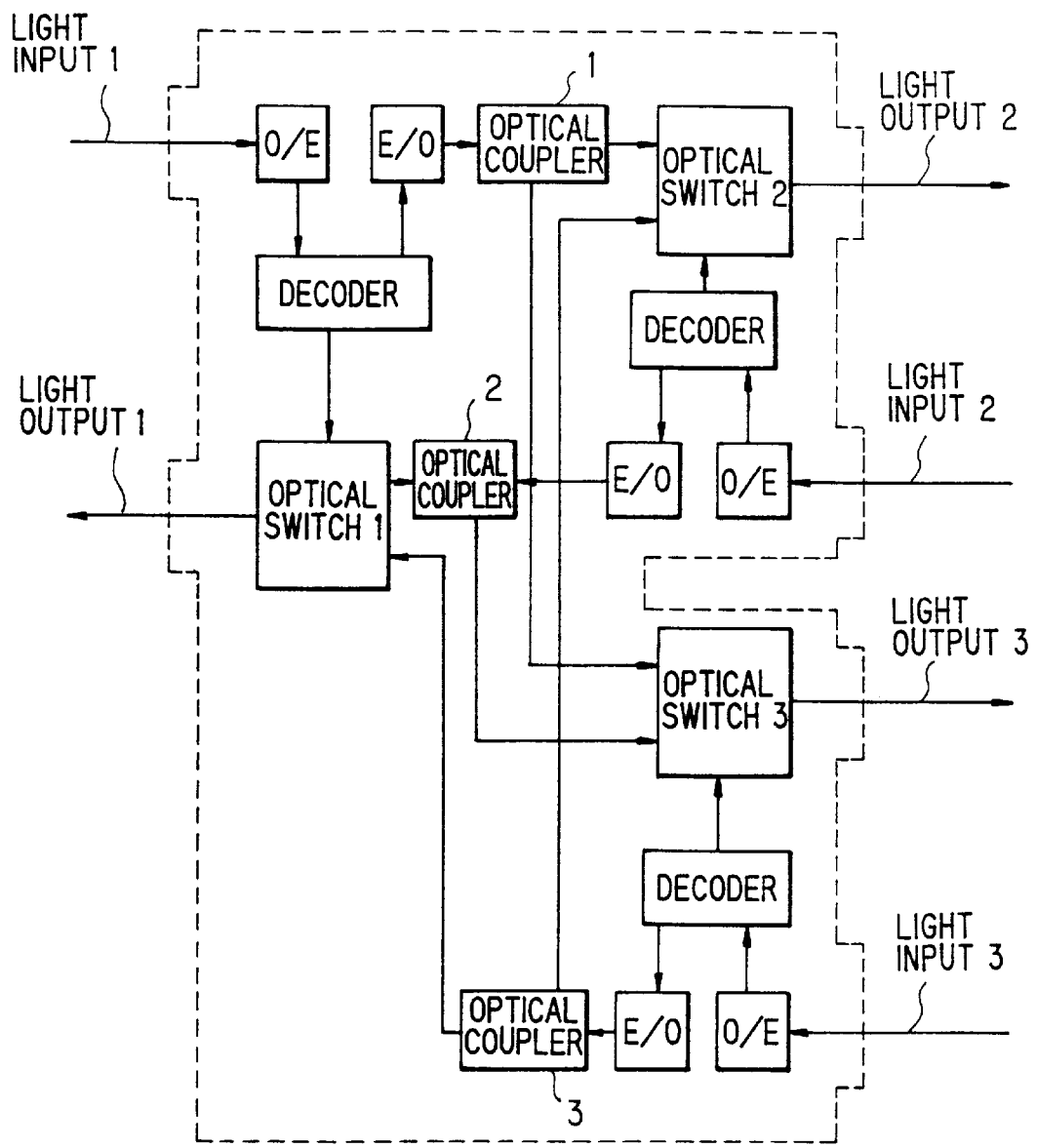
FIG. 1 is a block diagram showing the conventional marine optical divider.
Figure 2:
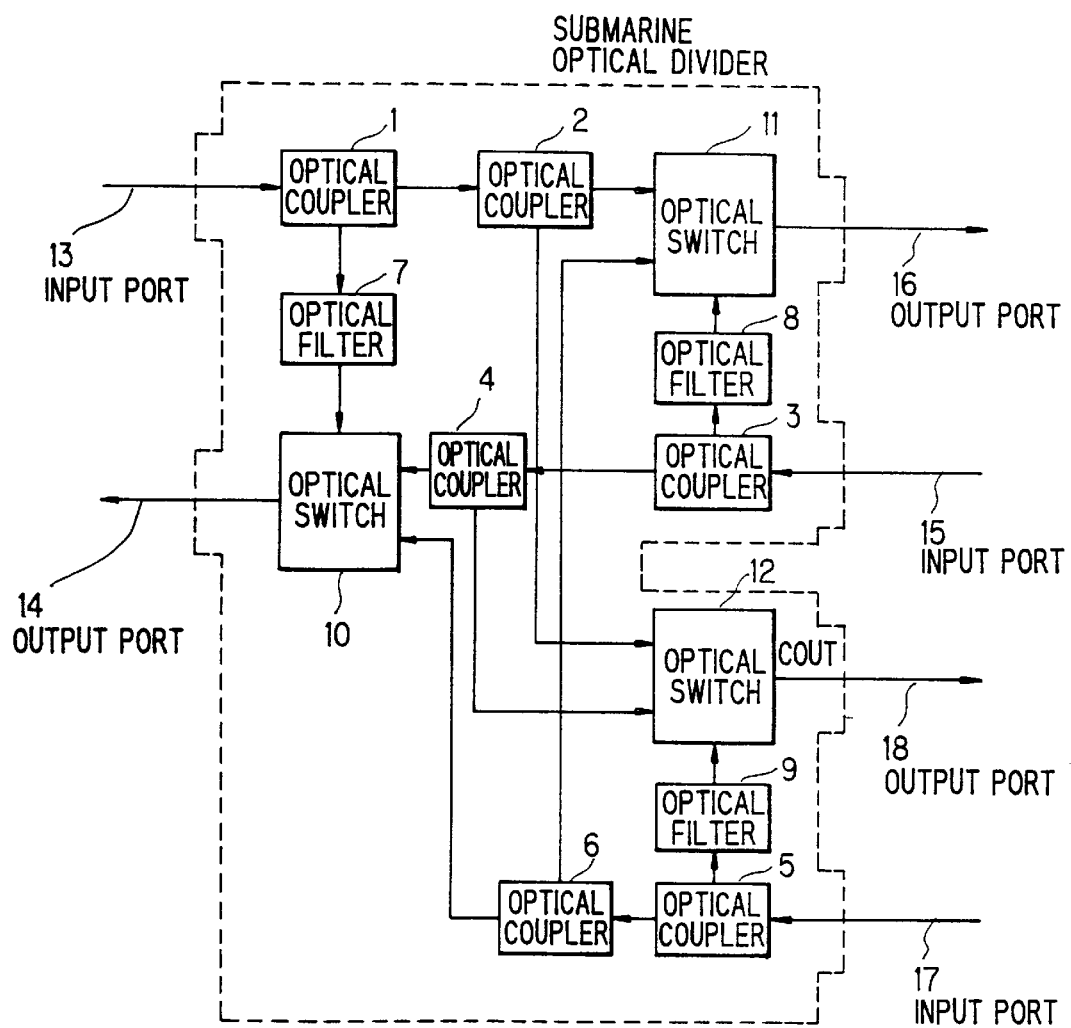
FIG. 2 is a block diagram showing a marine optical divider in a preferred embodiment according to the invention.
Figure 3A:
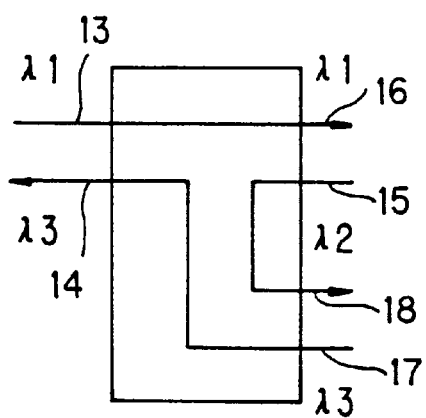
FIGS. 3A and 3B are illustrations showing the operations of the marine optical divider in the embodiment.
Figure 3B:
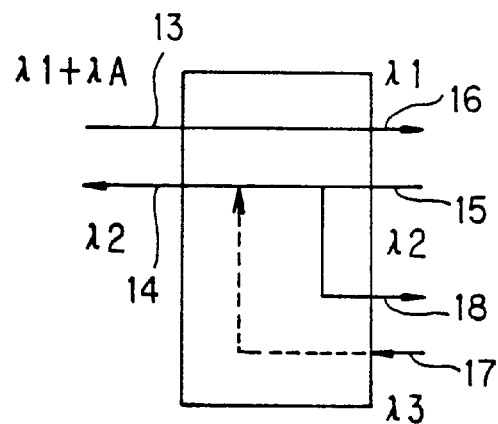

A submarine optical divider in the preferred embodiment will be explained in FIGS. 2 and 3B. FIG. 2 is a block diagram showing the submarine optical divider in this embodiment. FIGS. 3A and 3B are illustrations showing the input and output operations in the submarine optical divider.

As shown in FIG. 2, the submarine optical divider in the embodiment, which has three input ports and three output ports, is composed of optical couplers 1, 3 and 5 which are connected to input ports 13, 15 and 17, respectively, optical couplers 2, 4 and 6 which divide one optical signal into two optical signals, optical switches 10 to 12 which are connected to output ports 14, 16 and 18, respectively, optical filters 7 to 9 which extract selection signals to control the selecting operation of the optical switches 10 to 12. Namely, the submarine optical divider is composed of three base circuits, each base circuit being composed of four components to be taken one by one from the above four kinds of components, which are connected to each other.

Each of the optical couplers 1, 3 and 5 is an optical element with one input and two outputs, where an optical signal to be input is output divided into a first optical signal and a second optical signal. The optical signal inputs of the optical couplers 1, 3 and 5 are connected to the input ports 13, 15 and 17, respectively.

Each of the optical couplers 2, 4 and 6 is an optical element with one input and two outputs, where an optical signal to be input is output divided into two optical signals.

To the respective optical signal inputs of the optical couplers 2, 4 and 6, the second optical signals to be output from the optical couplers 1, 3 and 5 are input. Also, the two outputs of each of the optical couplers 2, 4 and 6 are connected to the optical switches of the two base circuits other than its own base circuit.

The optical filters 7 to 9 are elements where the propagation characteristics depend on the frequency value of an optical signal and an optical signal with a predetermined specific wavelength is extracted from the optical signal. The optical filters 7 to 9, which are disposed between the first output of the optical couplers 1, 3 and 5 and the selection signal inputs of the optical switches 10 to 12, extract only a predetermined specific optical signal from an optical signal to be input. The extracted optical signal is output to the selection signal inputs of the optical switches 10 to 12.

The optical switches 10 to 12, each of which has two inputs and one output as well as a control signal input to control the switching of output line, are used to switch the connection between the two inputs and one output by a control signal. A control signal in this embodiment is composed of an optical signal with or without a predetermined specific wavelength.

The optical input and output ports 13 to 18, which are the input and output terminals of the submarine optical divider, are classified into three pairs A, B and C of input and output ports. The combinations in the three pairs A, B and C are A input port 13 and A output port 14, B input port 15 and B output port 16, and C input port 17 and C output port 18.

The functions of the respective elements of the submarine optical divider in this embodiment will be explained below.

The optical coupler 1 divides an optical signal input from the A input port 13 into two directions, one is output to the optical coupler 2 and the other is output to the optical filter 7.

The optical filter 7 outputs an optical signal with a specific wavelength to the control signal input of the optical switch 10 when the optical signal with the specific wavelength exists in the optical signal to be input.

The optical switch 10 outputs an optical signal input to the B input port 15 to the A output port 14 when the optical signal with the specific wavelength is output from the optical filter 7, and it outputs an optical signal input to the C input port 17 to the A output port 14 when the optical signal with the specific wavelength is not output from the optical filter 7.

FIG. 3 shows the operations of the A output port 14 which depend on an optical signal to be input to the A input port 13.

The optical coupler 3 divides an optical signal input from the B input port 15 into two directions, one is output to the optical coupler 4 and the other is output to the optical filter 8.

The optical filter 8 outputs an optical signal with a specific wavelength to the control signal input of the optical switch 11 when the optical signal with the specific wavelength exists in the optical signal to be input.

The optical switch 11 outputs an optical signal input to the C input port 17 to the B output port 16 when the optical signal with the specific wavelength is output from the optical filter 8, and it outputs an optical signal input to the A input port 13 to the B output port 16 when the optical signal with the specific wavelength is not output from the optical filter 8.

The optical coupler 5 divides an optical signal input from the C input port 17 into two directions, one is output to the optical coupler 6 and the other is output to the optical filter 9.

The optical filter 9 outputs an optical signal with a specific wavelength to the control signal input of the optical switch 12 when the optical signal with the specific wavelength exists in the optical signal to be input.

The optical switch 12 outputs an optical signal input to the C input port 13 to the C output port 18 when the optical signal with the specific wavelength is output from the optical filter 9, and it outputs an optical signal input to the B input port 15 to the A output port 14 when the optical signal with the specific wavelength is not output from the optical filter 9.

Next, the operation of the marine optical divider in the embodiment will be explained in FIGS. 3A and 3B, where propagation lines of optical signal in the marine optical divider as described above are schematically shown. FIG. 3A shows a normal state and FIG. 3B shows the case that an optical signal with a predetermined specific wavelength is included in an optical signal to be input an input port.

In the normal state as shown in FIG. 3A, where an optical signal which does not include the optical signal with a specific wavelength of $\lambda A$ is input to the A input port 13, the optical signal input to the A input port 13 is output through the optical coupler 1 to the optical coupler 2 and optical filter 7. However, there is no output from the optical filter 7 to the optical switch 10 since the optical filter 7 passes only the optical signal with the specific wavelength of $\lambda A$. Thus, the optical switch 10 outputs an optical signal input to the C input port 17 to the A output port 14 since it receive no optical signal from the optical filter 7.

In the state as shown in FIG. 3B, where an optical signal which includes the optical signal with a specific wavelength of $\lambda A$ is input to the A input port 13, the optical signal input to the A input port 13 is output through the optical coupler 1 to the optical coupler 2 and optical filter 7. In this case, the optical signal with the specific wavelength of $\lambda A$ is transmitted through the optical filter 7 to the optical switch 10. The optical switch 10 outputs an optical signal input to the B input port 15 to the A output port 14 when the optical signal with the specific wavelength is input to the control signal input of the optical switch 10.

Also, when an optical signal which includes the optical signal with a specific wavelength of $\lambda B$ to be transmittable through the optical filter 8 is input to the B input port 15, the optical signal is output through the optical coupler 3 to the optical coupler 4 and optical filter 8. In this case, the optical signal with the specific wavelength of $\lambda B$ is transmitted through the optical filter 8 to the control signal input of the optical switch 11. The optical switch 11 outputs an optical signal input to the C input port 17 to the B output port 16 when the optical signal with the specific wavelength is input to the control signal input of the optical switch 11.

When an optical signal which does not include the optical signal with a specific wavelength of $\lambda B$ is input to the B input port 15, the optical signal is output through the optical coupler 4 to the optical coupler 4 and optical filter 8. However, there is no output from the optical filter 8 to the optical switch 11 since the optical filter 8 passes only the optical signal with the specific wavelength of $\lambda B$. Thus, the optical switch 11 outputs an optical signal input to the A input port 13 to the B output port 16 since it receive no optical signal from the optical filter 8.

Further, when an optical signal which includes the optical signal with a specific wavelength of $\lambda C$ to be transmittable through the optical filter 9 is input to the C input port 17, the optical signal is output through the optical coupler 5 to the optical coupler 6 and optical filter 9. In this case, the optical signal with the specific wavelength of λC is transmitted through the optical filter 9 to the control signal input of the optical switch 12. The optical switch 12 outputs an optical signal input to the A input port 13 to the C output port 18 when the optical signal with the specific wavelength is input to the control signal input of the optical switch 12.

When an optical signal which does not include the optical signal with a specific wavelength of λC is input to the C input port 17, the optical signal is output through the optical coupler 5 to the optical coupler 6 and optical filter 9. However, there is no output from the optical filter 9 to the optical switch 12 since the optical filter 9 passes only the optical signal with the specific wavelength of λC. Thus, the optical switch 12 outputs an optical signal input to the B input port 15 to the C output port 18 since it receive no optical signal from the optical filter 9.

As described above, in this embodiment, the transmission line for transmitting optical switch control signal light to be wavelength-multiplexed with a main signal is composed connecting through the optical coupler and optical filter to the optical switch. In this composition, the optical switch control signal light to be wavelength-multiplexed with the main signal is extracted by the optical coupler and optical filter, and the optical switch is controlled to switch the optical path depending on whether the optical switch control signal light is included or not thus, according to the form of an optical signal to be input to the three input ports, the output paths of optical signal toward the three output ports can be switched.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical divider with three input ports and three output ports for-dividing an optical signal, comprising:

three base circuits, each of which comprising a first optical coupler which is connected to a predetermined input port of said three input ports and outputs a first optical signal and a second optical signal by dividing an optical signal to be input to said predetermined input port in two directions, an optical switch which is composed of two optical signal inputs and one optical signal output which is connected to an output port of said three output ports which is paired with said predetermined input port and selects either of two optical signal to be input to said two optical signal inputs by using said first optical signal as a selection signal to output it from said optical signal output, and a second optical coupler where said second optical signal is input and then is further divided into a third optical signal and a fourth optical signal in two directions;

wherein said third and fourth optical signals of one of said three base circuits are individually input to one of said two optical signal inputs of an optical switch in two base circuits other than said one of said three base circuits.

2. An optical divider, according to claim 1, wherein:

said base circuit comprises further an optical filter where said first optical signal is input and then an optical signal with a predetermined specific wavelength is extracted from said first optical signal, and said extracted optical signal with said predetermined specific wavelength is used as said selection signal.

3. An optical divider, according to claim 2, wherein:

said selection of either of said two optical signal to be input to said two optical signal inputs is conducted depending on whether said extracted optical signal with said predetermined specific wavelength is included in said first optical signal or not.

4. An optical divider, comprising:

an optical coupler for dividing an optical input signal into first and second optical output signals;

an optical filter for transmitting an optical signal of a predetermined wavelength; and an optical switch having first and second input terminals, an output terminal, and a control terminal;

wherein said optical signal of said predetermined wavelength is supplied from said optical filter to said optical switch, when said optical coupler is supplied with said optical input signal which is a wavelength-multiplexed signal comprising an information optical signal and said optical signal of said predetermined wavelength, so that said first input terminal is coupled in said optical switch, to said output terminal, and no optical signal of said predetermined wavelength is supplied from said optical filter to said control terminal of said optical switch, when said optical coupler is supplied with said optical input signal comprising no optical signal of said predetermined wavelength, so that said second input terminal is coupled in said optical switch to said output terminal.

* * * * *